United States Patent
Kwag et al.

(10) Patent No.: US 8,297,754 B2
(45) Date of Patent: Oct. 30, 2012

(54) APPARATUS AND METHOD OF CONTROLLING CAMERA WORK BASED ON DIRECTION RULE

(75) Inventors: Kyung-soo Kwag, Suwon-si (KR); Bo-gyeong Kang, Seoul (KR); Hyun-ju Shim, Daejeon-si (KR); Ho-sub Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 503 days.

(21) Appl. No.: 12/553,608

(22) Filed: Sep. 3, 2009

(65) Prior Publication Data

US 2010/0066862 A1 Mar. 18, 2010

(30) Foreign Application Priority Data

Sep. 18, 2008 (KR) .................. 10-2008-0091611

(51) Int. Cl.
*H04N 5/76* (2006.01)
*H04N 5/228* (2006.01)

(52) U.S. Cl. .................. 352/243; 348/207.11; 348/211.4

(58) Field of Classification Search .................. 352/243, 352/244; 348/207.11, 211.99–211.14
See application file for complete search history.

(56) References Cited

U.S. PATENT DOCUMENTS

| | | | |
|---|---|---|---|
| 5,900,925 A * | 5/1999 | Navarro | 352/53 |
| 7,750,944 B2 * | 7/2010 | Arbogast | 348/211.7 |
| 2005/0007553 A1 * | 1/2005 | Romanoff et al. | 352/243 |
| 2005/0285950 A1 * | 12/2005 | Oya | 348/211.4 |
| 2010/0013836 A1 * | 1/2010 | Kang et al. | 345/473 |
| 2010/0149337 A1 * | 6/2010 | Porcino | 348/159 |

FOREIGN PATENT DOCUMENTS

| | | |
|---|---|---|
| JP | 2005-267005 | 9/2005 |
| JP | 2007-034857 | 2/2007 |
| JP | 2008-097233 | 4/2008 |
| KR | 1020000050029 | 8/2005 |

\* cited by examiner

*Primary Examiner* — William C Dowling
(74) *Attorney, Agent, or Firm* — NSIP Law

(57) ABSTRACT

Provided are an apparatus and method of controlling camerawork based on direction rule. A camerawork controlling apparatus includes a direction deciding unit configured to receive dialogs extracted from a scenario, to divide at least one of the received dialogs into sub-elements according to a set of circumstances, and to determine a camerawork based on a direction rule to be applied to each sub-element and each of any remaining non-divided dialogs.

15 Claims, 11 Drawing Sheets

APPARATUS AND METHOD OF CONTROLLING CAMERA WORK BASED ON DIRECTION RULE

CROSS REFERENCE TO RELATED APPLICATION(S)

This application claims the benefit under 35 U.S.C. §119(a) of a Korean Patent Application No. 10-2008-0091611, filed Sep. 18, 2008, the disclosure of which is incorporated herein in its entirety by reference.

BACKGROUND

1. Field

The following description relates to camerawork of moving pictures including movies and animation, and more particularly, to an apparatus and method of controlling camerawork based on direction rule and data storage medium to record camerawork data.

2. Description of the Related Art

When making a film or an animation, camera movements including an angle, a location, and moving of a camera may vary according to speech, action, mood of characters, and background environment. A camera director may make images by operating a camera based on his/her experiences and know-how, as well as a scenario. Techniques related to the operation of a camera for filming may be referred to as camerawork.

Conventionally, to set the camerawork, an operator is required to determine every detail of the camera setting, such as a location, a direction, an angle, an angle of view, and movements of the camera. That is, a photography specialist or an animation expert decides how and from which direction to move the camera, which position to take a shot of an object, and so on. The photography specialist or the animation expert also determine detail values for the camera settings and operate the camera according to the values.

Given this complexity of expertise and know-how, it may be difficult for an ordinary user to predict the values for setting the camerawork to obtain natural images or animations regarding image aesthetics and thus, the ordinary user may have difficulties when making a film or an animation.

In addition, the ordinary user may face such difficulties as use and coordination of a great number of cameras to complete a film or an animation, which it is time-consuming and labor intensive to set the camerawork for each camera.

SUMMARY

According to one general aspect, there is provided a camerawork controlling apparatus including a direction deciding unit configured to receive dialogs extracted from a scenario, to divide at least one of the received dialogs into sub-elements according to a set of circumstances, and to determine a camerawork based on a direction rule to be applied to each sub-element and each of any remaining non-divided dialogs.

The direction deciding unit may determine the camerawork for each received dialog using at least one of location information of an object, history information of camerawork previously used, and a direction rule including at least one of a general direction rule, a style direction rule, and a media style direction rule.

The direction deciding unit may include a token processing unit to search for a direction rule to be applied to all received dialogs and to determine a camerawork corresponding to each received dialog to which the direction rule is to be applied and to divide any remaining received dialogs to which the direction rule is not to be applied into tokens, a shot framer to search for direction rules corresponding to any respective divided tokens and to determine a camerawork for each corresponding token and to divide each non-corresponding token into fragments indicating positions where the camerawork starts, a shot deciding unit to search for direction rules corresponding to any respective fragment and to determine a camerawork for each corresponding fragment and to determine shot frames for each non-corresponding fragments, and a transition deciding unit to search for a direction rule to connect adjacent fragments and to determine a connection between shots in each fragment.

The camerawork controlling apparatus may further include a data storage unit to store a direction rule to determine the camerawork.

The data storage unit may include a general rule storage unit to store general direction rules used to determine camerawork, a style rule storage unit to store style direction rules used to determine camerawork using specific effects corresponding to particular situations, and a media style storage unit to store media style direction rules used to determine camerawork to which pre-defined characteristics of individual users are reflected.

The camerawork controlling apparatus may further include a location calculating unit to identify a location of an object including characters and props.

The camerawork controlling apparatus may further include a camerawork history managing unit to store and analyze a history of previously used camerawork.

The each dialog may be divided into at least one of a speech token, an action token, and an emotion token and each of the at least one of the speech token, the action token, and the emotion token may be further divided into fragments, wherein each fragment may indicate a location where a camerawork starts.

According to another aspect, there is provided a computer readable data storage medium having embodied thereon camerawork data representing a shot frame and camera movement information in the form of a markup language, wherein the shot frame and the camera movement information constitute a camerawork.

The shot frame may include information of a number of objects in a shot, a size of each object, an empty space in a scene, and an angle at which the object is shot.

The camera movement information may include information of connection from a previous shot and information of frame movement.

The camerawork data may be determined based on a direction rule, wherein dialogs are extracted from a scenario and received sequentially, at least one of the dialogs is divided into sub-elements according to circumstances, and the direction rule is applied to each divided sub-elements and each of any remaining non-divided dialogs.

According to still another aspect, there is provided a camerawork controlling method for use with a camera controlling apparatus, the method including receiving in a direction deciding unit dialogs extracted from a scenario sequentially, and dividing at least one of the received dialogs into sub-elements according to circumstances and determining a camerawork based on a direction rule applied to each sub-element and each of any remaining non-divided dialogs by a token processing unit.

The determining of the camerawork may include determining the camerawork for the received dialog based on at least one of location information of an object, camerawork history information, and a direction rule including at least one of a general direction rule, a style direction rule, and a media style direction rule.

The determining of the camerawork may include determining a camerawork corresponding to the received dialogs by searching for a direction rule to be applied to the received dialogs and dividing any received dialog to which the direction rule is not to be applied into tokens by a token processing unit, determining camerawork for the tokens by searching for direction rules corresponding to the respective token and dividing any token not corresponding to the searched direction rules into fragments each of which indicates a location where a camerawork is inserted by a shot framer, determining camerawork for the fragments by searching for direction rules corresponding to respective fragments and determining shot frames for the respective fragments by a shot deciding unit, and determining connection between adjacent fragments by searching for a direction rule to connect the adjacent fragments by a transition deciding unit.

Other features and aspects will be apparent from the following description, drawings, and claims.

BRIEF DESCRIPTION OF THE DRAWINGS

Throughout the drawings and the detailed description, unless otherwise described, the same drawing reference numerals will be understood to refer to the same elements, features, and structures. The relative size and depiction of these elements may be exaggerated for clarity and convenience.

DETAILED DESCRIPTION

The following detailed description is provided to assist the reader in gaining a comprehensive understanding of the media, methods, apparatuses, and systems described herein. Accordingly, various changes, modifications, and equivalents of the media, methods, apparatuses, and systems described herein will be suggested to those of ordinary skill in the art. Also, descriptions of well-known functions and structures may be omitted for increased clarity and conciseness.

Figure 1:
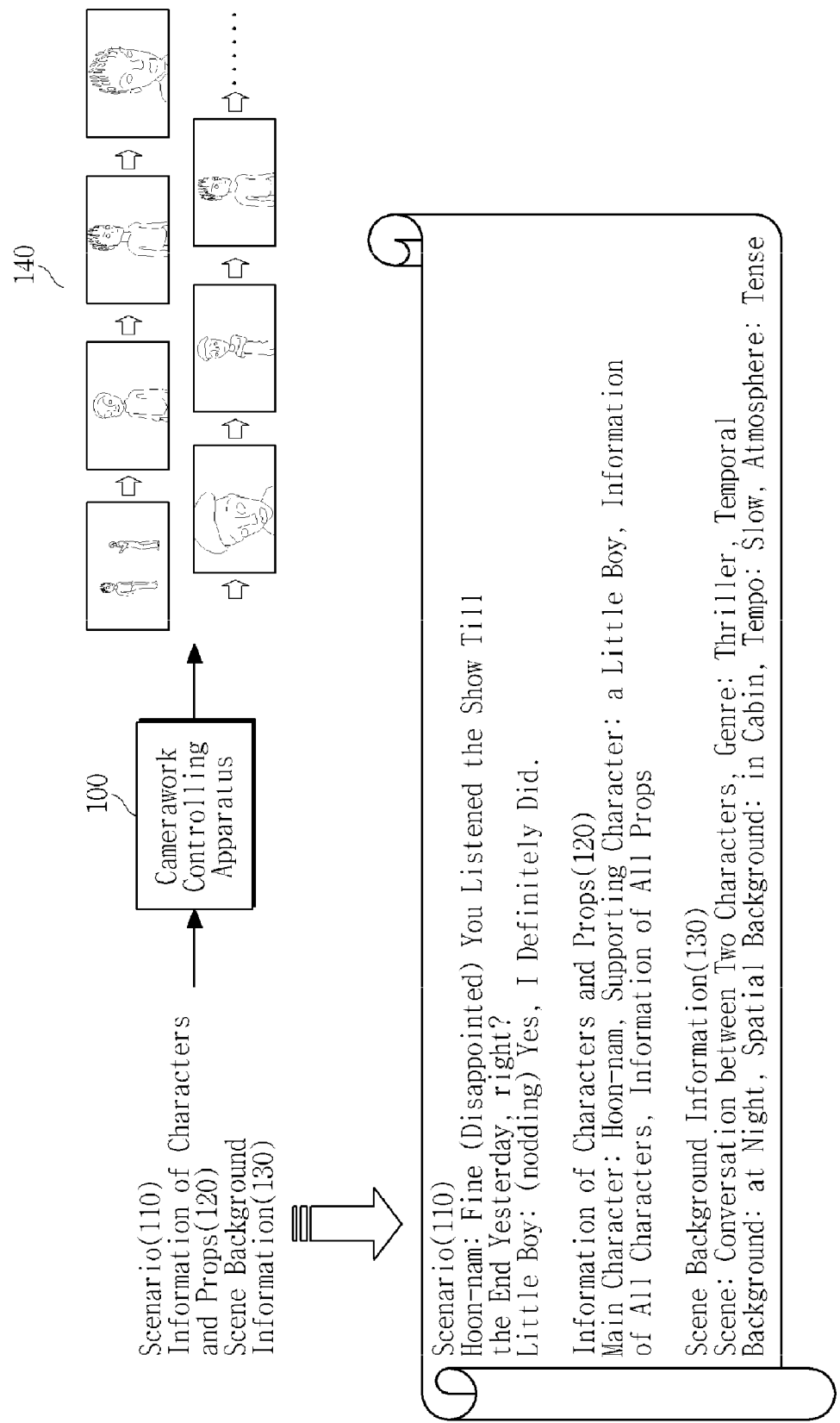
FIG. 1 is a diagram showing input and output of an exemplary camerawork controlling apparatus.

FIG. 1 illustrates input and output of an exemplary camerawork controlling apparatus 100. The camerawork controlling apparatus 100 receives information including a scenario 110, information of characters and props 120, and scene background information 130. The scenario 110 may be a part of, or may be the entire, scenario for which the camerawork is used. The scenario 110 includes one or more dialogs. The dialogs may generally include speech, action, and emotion of characters, etc. Referring to the example as shown in FIG. 1, the scenario 110 includes speech (i.e., "fine"), emotion (i.e., "(disappointed)"), and action (i.e., "(nodding)").

The information of characters and props 120 may include all pieces of information about every character and prop shown in the scenario 110. Examples of the information of characters and props 120 may include identifications (ID), locations, characteristics, sizes and figures of characters, character importance in the scenario, and the like. Referring to the example shown in FIG. 1, the information 120 shows a main character, "Hoon-nam," a supporting actor, "little boy," and includes information about other characters and props.

The scene background information 130 may include all pieces of information about the background necessary for making an animation. For example, the scene background information 130 may include a genre of the animation and a type of a current scene, such as a speech scene, an action scene, or a chase scene. Furthermore, the scene background information 130 also may include information of a spatial background, a temporal background, and the entire atmosphere. In the current scene of FIG. 1, the genre is a thriller, two characters are having a conversation in a cabin at night, and tension is growing slowly between the characters.

The camerawork controlling apparatus 100 outputs camerawork data for the whole story based on the received scenario 110, the information of characters and props 120, and the scene background information 130. The camerawork data may include information about the construction of each shot, which constitutes the camerawork and information about how to connect the shots together. An example of information of the construction and the way of connecting the shots will be described below with reference to FIG. 11.

Figure 2:
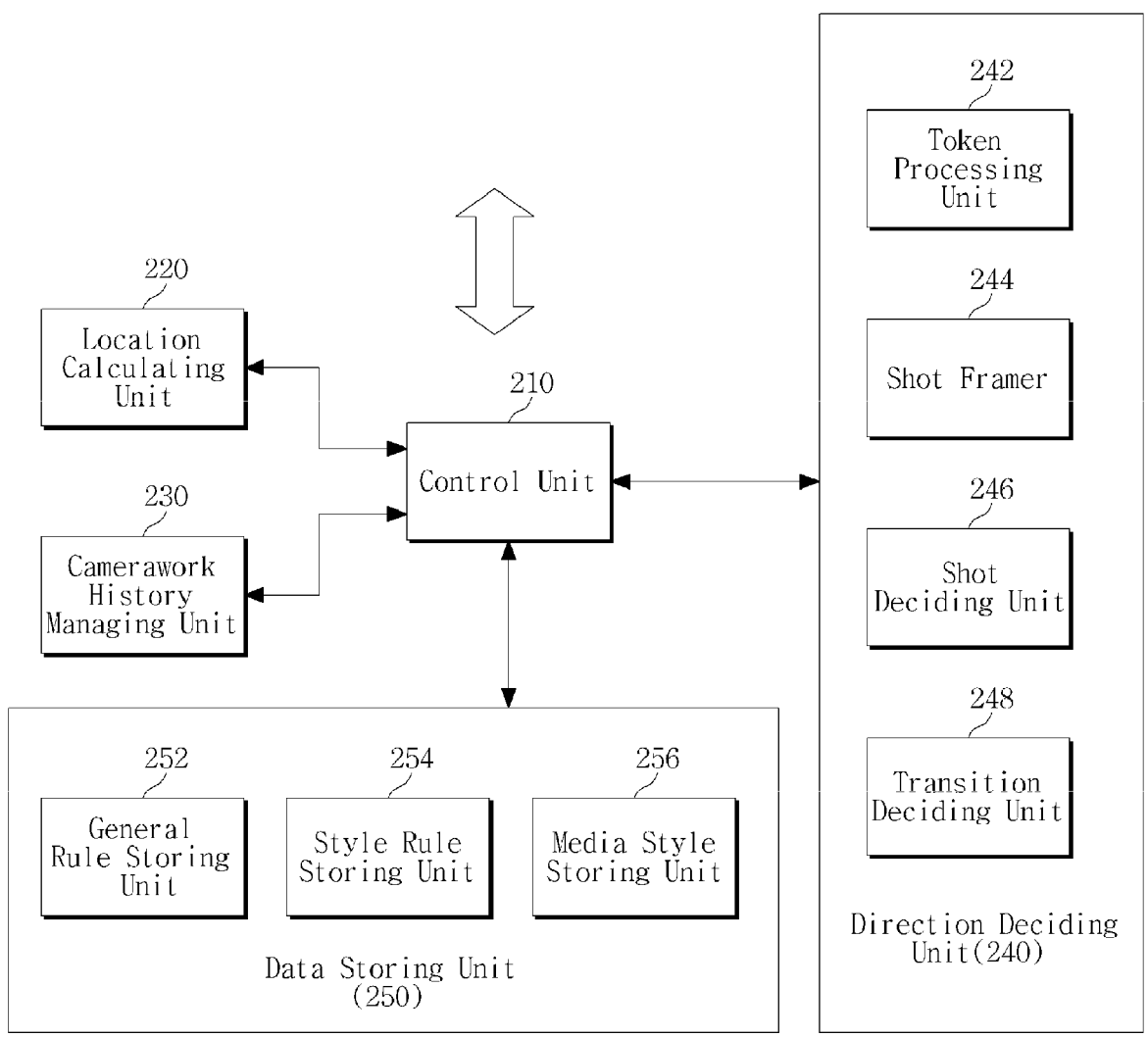
FIG. 2 is a diagram showing an exemplary camerawork controlling apparatus.

FIG. 2 illustrates an exemplary camerawork controlling apparatus 100. The camerawork controlling apparatus 100 includes a control unit 210, a location calculating unit 220, a camerawork history managing unit 230, a direction deciding unit 240, and a data storage unit 250. The direction deciding unit 240 includes a token processing unit 242, a shot framer 244, a shot deciding unit 246, and a transition deciding unit 248. The data storage unit 250 includes a general rule storage unit 252, a style rule storage unit 254, and a media style storage unit 256.

The control unit 210 individually control elements inside the camerawork controlling apparatus 100 and transmits the received scenario 110, the information of characters and props 120, and the scene background information 130 to each element. In addition, the control unit 210 outputs a result generated by the camerawork controlling apparatus 100 to the exterior.

The location calculating unit 220 recognizes locations of objects including characters and props. The recognized locations may be represented by X and Y coordinates or ID values describing each point where each object is located.

The camerawork history managing unit 230 stores and analyzes the history of all prior camerawork used. The stored camerawork history information may be used to determine a current camerawork. For example, with reference to the camerawork history, currently unavailable camerawork for a specific scene or a specific case may be determined.

The direction deciding unit 240 receives dialog and decides camerawork for each dialog. In this course, camerawork may be determined with reference to location information of an object; camerawork history information, and directional information such as a general rule; a style rule, and a media style, which are stored in the data storage unit 250. Additionally, a dialog extracting unit (not shown) may be separately employed to extract dialog from a scenario.

The token processing unit 242 searches for a direction rule generally applied to the whole dialog, and may decide camerawork for each dialog or may separate the dialog into small tokens. Here, a dialog may indicate the minimum input unit for determining the camerawork. For example, a line of sentence in a scenario can be a dialog. As shown in FIG. 1, for example, the sentence "Fine, (disappointed) you listened to the show till the end yesterday, right?" may be one dialog. A dialog also may be divided into a speech token, an action token, and an emotion token.

When the sentence of FIG. 1 discussed above is taken as an example, the sentence as a dialog may include speech tokens, "fine" and "you listened to the show till the end yesterday, right?" and an emotion token, "(disappointed)." In the second sentence as a dialog of FIG. 1, the sentence includes an action token, "(nodding)." As such, a dialog may be divided into one or more tokens. The token processing unit 242 may search for a direction rule to be applied to the entire dialog, and in response to receiving a direction rule to be applied to the entire dialog; the token processing unit 242 may determine camerawork for the entire dialog based on the direction rule. Where a direction rule to be applied to the entire dialog is not found, the token processing unit 242 may divide the dialog into tokens as described above.

The shot framer 244 searches for a corresponding direction rule for each token. Where each token has a corresponding direction rule, the shot framer 244 may determine camerawork for each respective token. Where a corresponding rule is not found for each token, the shot framer 224 may divide each token by fragments. A fragment is information indicating the start point of the camerawork in a token. In each fragment, a camerawork starting point may be represented in the form of time information or location information. For example, referring to FIG. 1, when the Hoon-nam's face is taken in one-shot during a speech token where Hoon-nam says "you listened to the show till the end yesterday, right?" the camerawork may begin taking Hoon-nam's face in one shot before he starts speaking, right after Hoon-nam says "you," or at any other time during his speaking. As such, to determine the starting point of the camerawork, several points in the token can be set as fragments.

The shot deciding unit 246 searches for direction rules corresponding to respective fragments and may determine camerawork for each corresponding fragment or may determine a shot frame for each fragment. A shot frame is a part of a shot, including all information related to the scene composition.

The transition deciding unit 248 searches for direction rules to connect adjacent fragments and may determine how to connect shots in each fragment. For example, shots may be connected continuously or cut by cut.

The data storage unit 250 stores the direction rules necessary for determining the camerawork.

The general rule storage unit 252 stores general direction rules that may be generally used to determine camerawork. Examples of general direction rules may include a 180-degree rule and a frame setting rule that can be applied to all types of images.

The style rule storage unit 254 stores style direction rules that may be used to obtain a specific effect of a particular scene. For example, to show emotions of two people in a romantic situation, camerawork using a circular track may be used.

The media style storage unit 256 stores media style direction rules that may be used to obtain a particular shot format, for example, a shot format characteristic of specific directors or newly created camerawork.

The data storage unit 250 including the general rule storage unit 252, the style rule storage unit 254, and the media style storage unit 256 may be implemented as a separate device without being installed inside the camerawork controlling apparatus 100. Accordingly, a direction rule stored in an additional database may accessed and used to determine camerawork.

Figure 3:
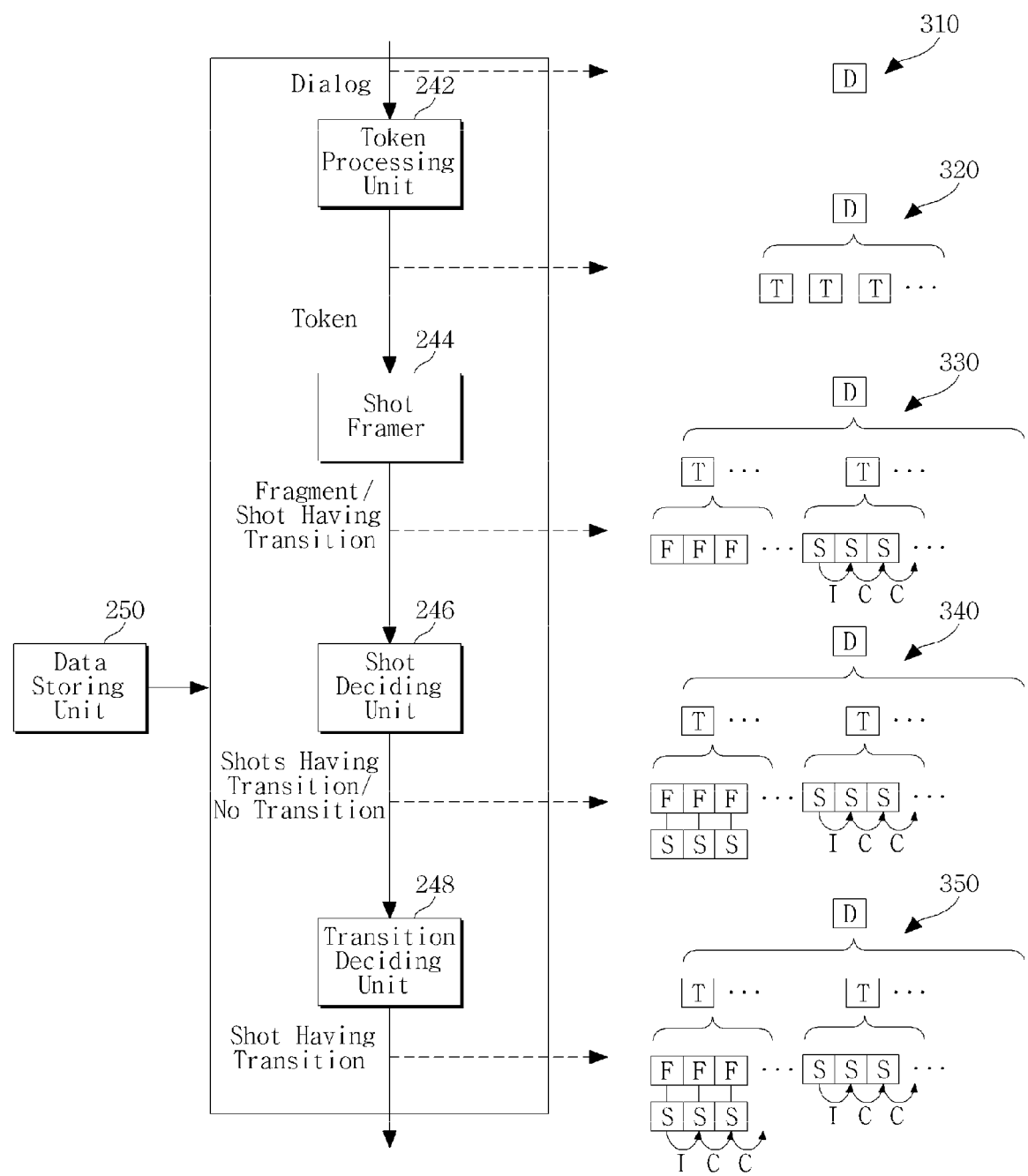
FIG. 3 is a diagram showing further detail of a direction deciding unit of the exemplary camerawork controlling apparatus shown in FIG. 2.

FIG. 3 illustrates the direction deciding unit 240 of the exemplary camerawork controlling apparatus 100 shown in FIG. 2 and examples of input and output data.

Data input to the token processing unit 242 is illustrated as dialog data 310. The token processing unit 242 processes the dialog data 310 determined to be divided into a plurality of tokens 320. The shot framer 244 divides each token into a plurality of either fragments or shots including transition information 330. The shot deciding unit 246 determines a shot at each fragment 340. The transition deciding unit 248 determines transitions for each shot and matches the determined transition to each respective shot 350. Through the above procedures, each shot has the transition determined therefore.

Figure 4:
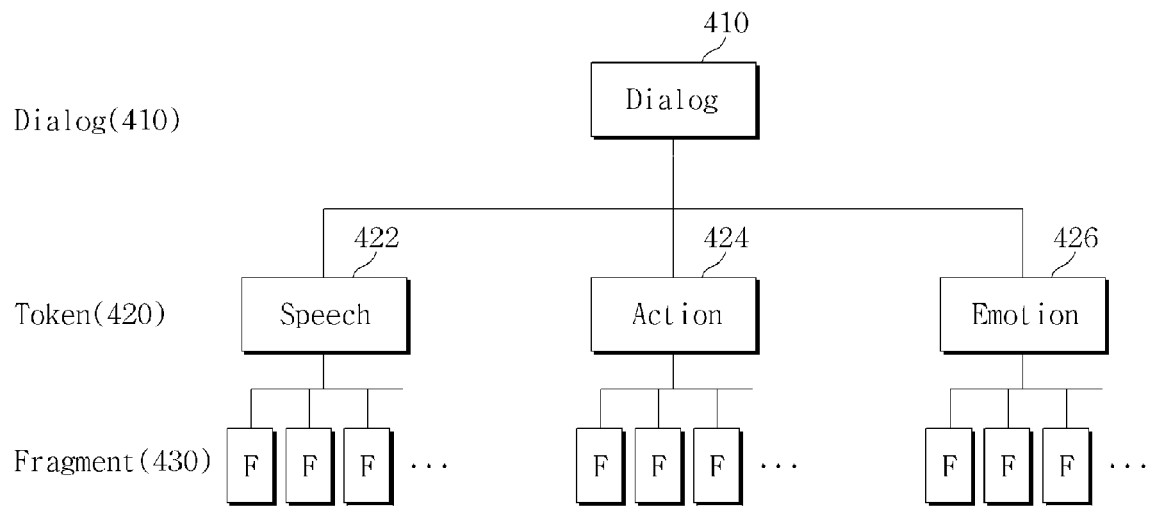
FIG. 4 is a diagram illustrating an exemplary dialog.

FIG. 4 illustrates an exemplary dialog 410. The dialog 410 is divided into tokens 420, which may include a speech token 422, an action token 424, and an emotion token 426. The speech token 422 may indicate a conversation between characters; the action token 424 may indicate character movement or object movement. The emotion token 426 may indicate a feeling or a mood of a character. For example, with reference to the dialog shown in FIG. 1, "fine" and "you listened to the show till the end yesterday, right?" may be speech tokens 422, "(disappointed)" may be an emotion token 426, and "(nodding)" may be an action token.

Each token 420 may be divided into fragments 430. As described above, each token 420 may include one or more fragments including information indicating where camerawork begins. For example, in the case of a short speech token "Fine," one fragment may be placed before the token. In other words, the camerawork may start before a character begins to speak the word "Fine." Thus, the fragments 430 may be set differently for each token 420.

Figure 5:
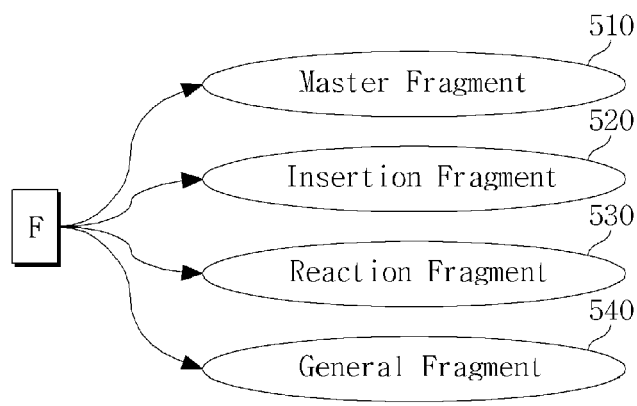
FIG. 5 is a diagram showing exemplary fragments.

FIG. 5 illustrates types of exemplary fragments. A fragment 500 may act as a master fragment 510, an insertion fragment 520, a reaction fragment 530, or a general fragment 540.

The master fragment 510 specifies a point where a master shot is inserted. The master shot may show all characters, objects, and background by capturing the characters, objects, and background in long shot at the beginning of a scene. The insertion fragment 520 indicates where an insertion shot is inserted. The insertion shot may add a detail shot or a metaphorical shot related to a primary scene to help fully understand the scene. The reaction fragment 530 specifies a point where a reaction shot is inserted. The reaction shot may show viewer reaction. The general fragment 540 may include all fragments other than the master fragment 510, the insertion fragment 520, and the reaction fragment 530.

Figure 6:
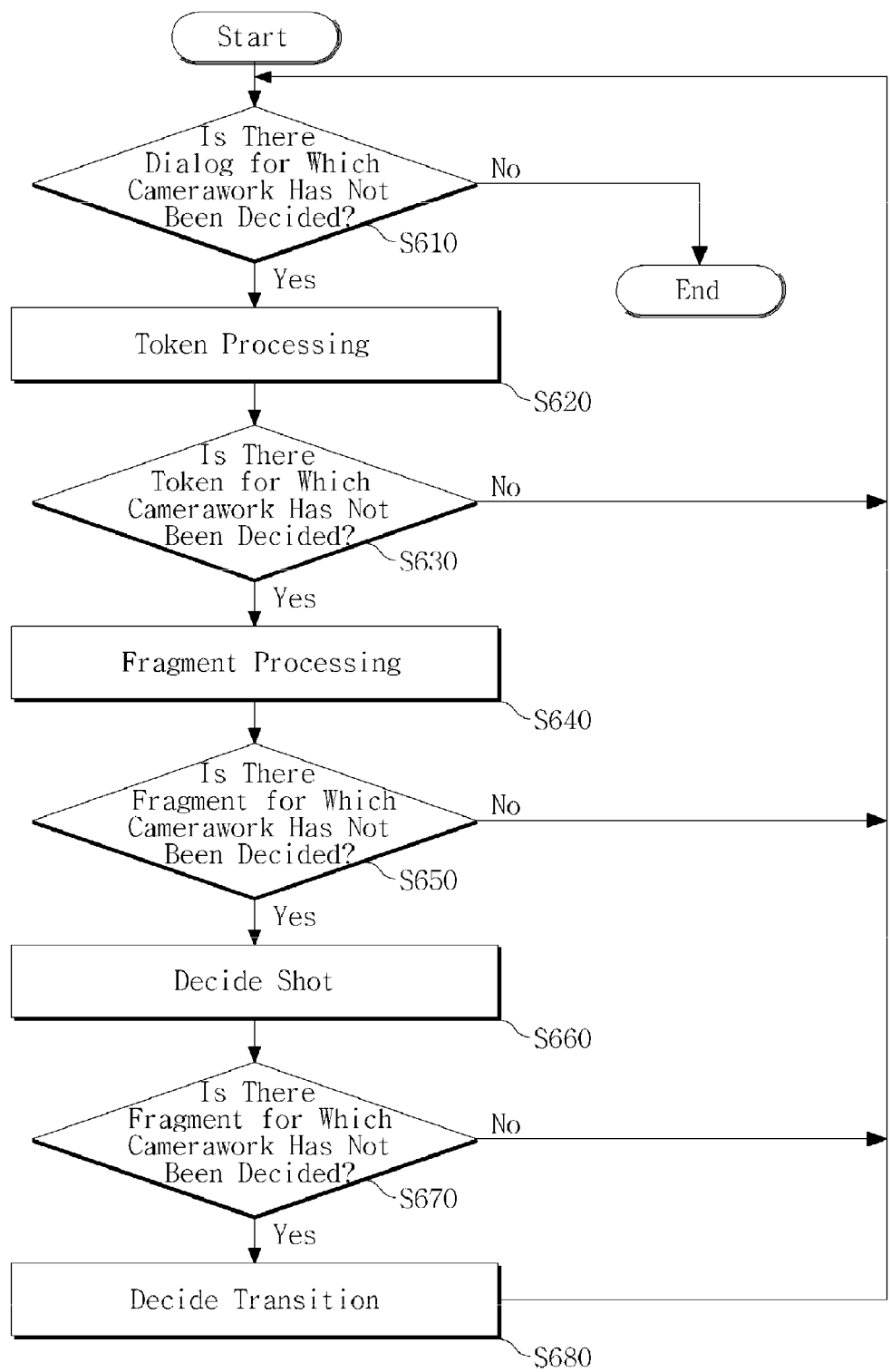
FIG. 6 is a flowchart illustrating an exemplary camerawork controlling method.

FIG. 6 illustrates an exemplary camerawork controlling method.

While dialogs extracted from a scenario are received one by one, it is determined whether camerawork for each received dialog has been determined (operation S610). Once the respective camerawork is determined for all received dialogs, the camerawork controlling process is finished.

Where camerawork for a dialog has not been determined, the dialog is transferred to the token processing unit 242 (operation S620). The camerawork for the dialog may be determined, for example, based on media style direction rules stored in the media style storage unit 265 or style direction rules stored in the style rule storage unit 254. Where the camerawork for the dialog cannot be determined using media style direction rules or style direction rules, the dialog may be divided into tokens.

It is determined whether camerawork has been determined for each token (operation S630). Where the respective camerawork has been determined for all tokens, it is again determined whether camerawork for all dialogs have been determined (operation S610). Where camerawork for a token has not been determined, the token is transferred to the fragment processing unit 244 (operation S640).

It is determined whether camerawork has been determined for each fragment within each token (operation S650). Once the respective camerawork for each fragment within each token has been determined, it is again determined whether camerawork for all dialogs have been determined (operation S610).

Where camerawork for a fragment has not been determined, the fragment is transferred to the shot deciding unit 246 to determine a shot for the fragment (operation S660). The shot deciding unit 246, for example, may search for a direction rule corresponding to respective fragments to determine the camerawork or a shot frame for the corresponding fragment.

It is determined whether camerawork has been determined for each fragment (operation S670). Once the respective camerawork for each fragment has been determined, it is again determined whether camerawork for all dialogs have been determined (operation S610).

Where camerawork for a fragment has not been determined, the fragment is transferred to the transition deciding unit 248 to determine a transition between shots (operation S680).

When a fragment is formed with respect to a dialog by the above procedures, the next dialog extracted from a scenario may be received and the above procedures may be repeatedly performed for each received dialog to determine a corresponding camerawork.

Figure 7:
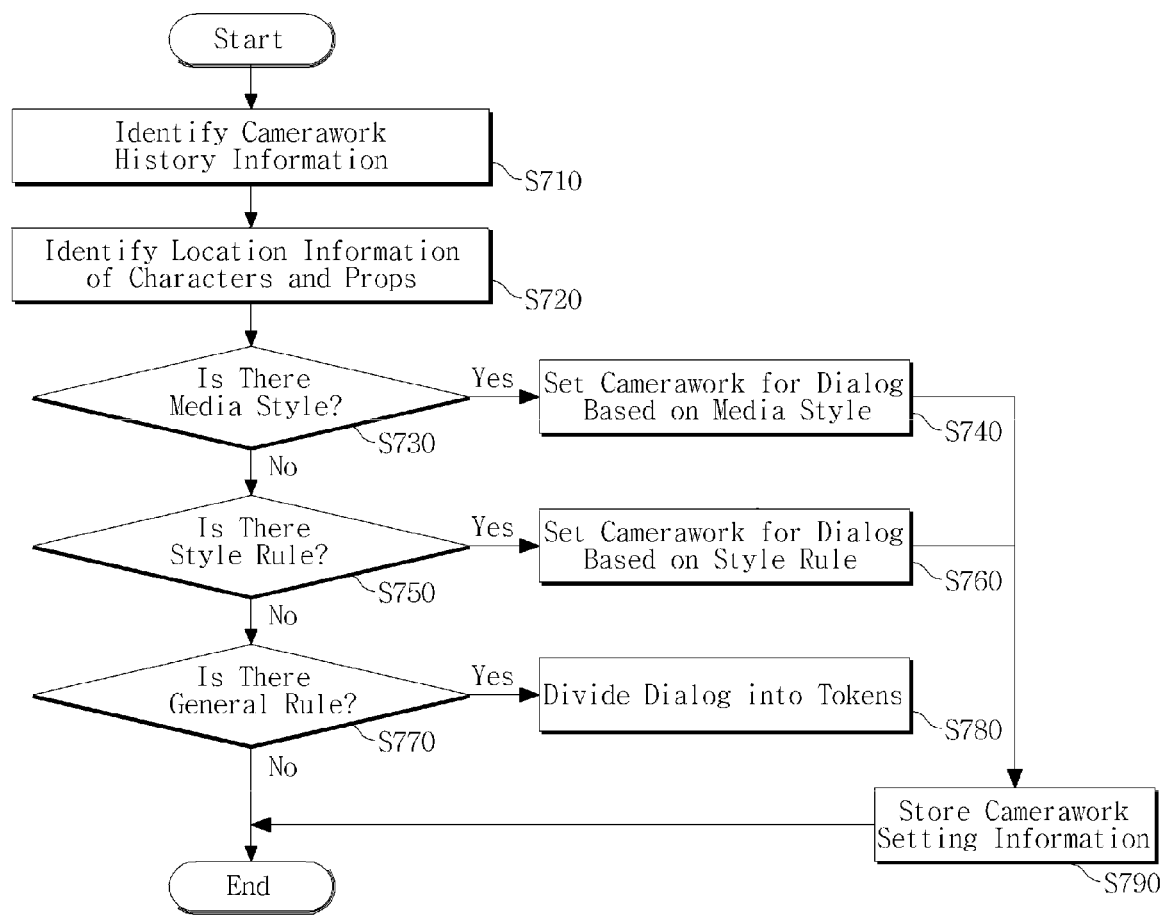
FIG. 7 is a flowchart illustrating an exemplary method of processing a token in a token processing unit shown in FIG. 2.

FIG. 7 illustrates an exemplary method of processing a token in the token processing unit 242 shown in FIG. 2.

The token processing unit 242 identifies camerawork history information, which is stored in the camerawork history managing unit 230, before processing the received dialog (operation S710).

The location calculating unit 220 receives location information of characters and props (operation S720).

It is determined whether a media style direction rule to be applied to the dialog with reference to the media style storage unit 256 (operation S730). Where a media style direction rule is to be applied to the dialog, camerawork for the current dialog is set based on the media style direction rule and at least one of the location information of the current characters and props, the camerawork history information (operation S740), and the set camerawork may be stored in the camerawork history managing unit 230 (operation S790).

Where a media style direction rule is not to be applied, it is determined whether there is a style direction rule to be applied to the dialog with reference to the style rule storage unit 254 (operation S730). Where a style direction rule is to be applied, camerawork for the current dialog is set based on the style direction rule, and at least one of the location information of the current characters and props, the camerawork history information (operation S740), and the set camerawork may be stored in the camerawork history managing unit 230 (operation S790).

Where a style direction rule is not to be applied, it is determined whether a general direction rule is to be applied to the dialog (operation S770). Where a general direction rule is to be applied, the dialog is divided into tokens (operation S780). Examples of tokens may include a speech token 424, an action token 424, and an emotion token 426.

Where no general direction rule is to be applied to the dialog, the procedure is finished without any process.

Figure 8:
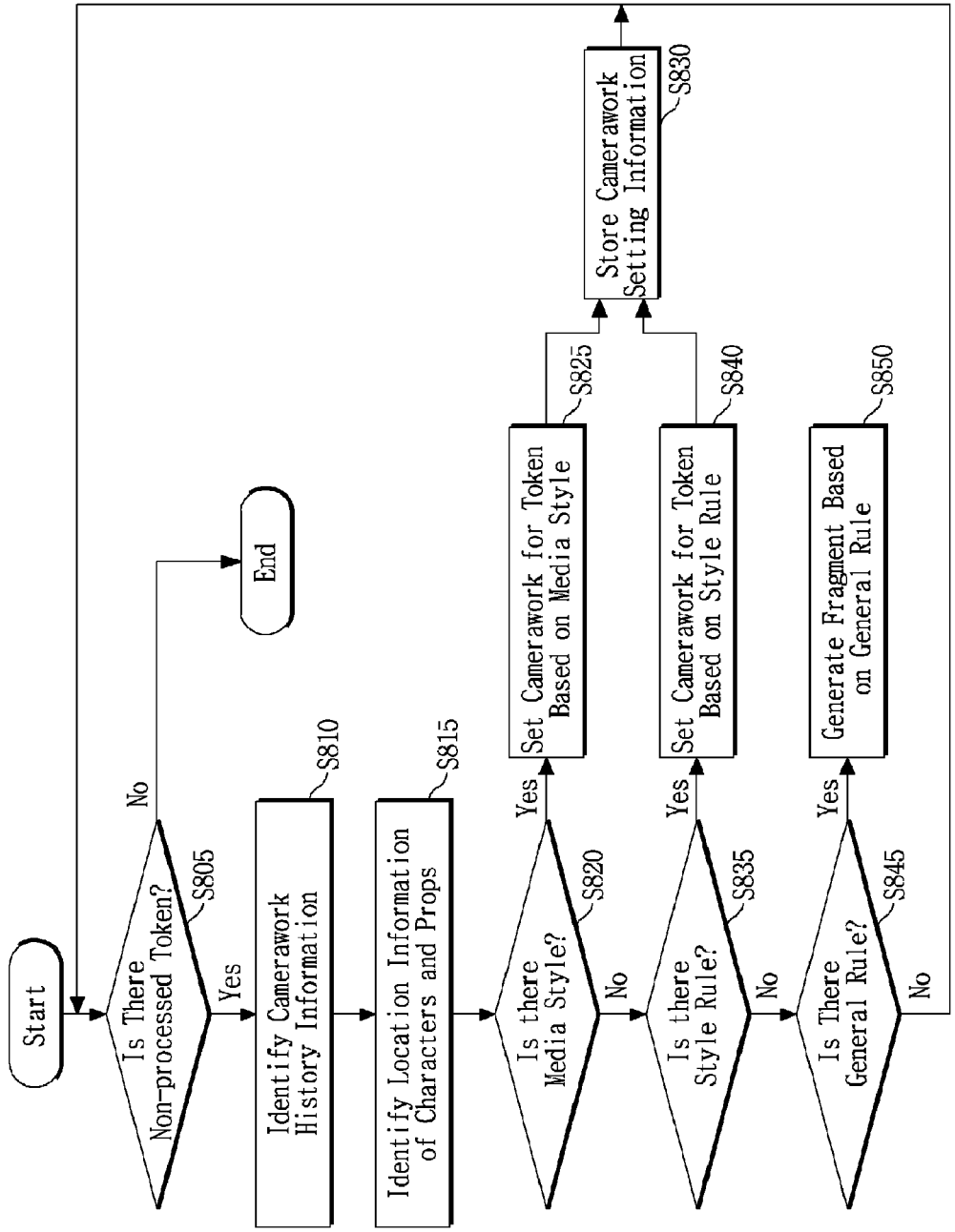
FIG. 8 is a flowchart illustrating an exemplary method of processing tokens in a shot framer shown in FIG. 2.

FIG. 8 illustrates an exemplary method of processing tokens in the shot framer 244 as shown in FIG. 2.

It is determined whether camerawork has been processed for each token in a dialog (operation S805). Where camerawork for all respective tokens has been processed, the procedure is finished.

Where camerawork has not been processed for all tokens, the tokens are processed one by one. The camerawork history information is identified, which is stored in the camerawork history managing unit 230 (operation S810). Pieces of location information of characters and props are received from the location calculating unit 220 (operation S815).

It is determined whether a media style direction rule is to be to applied to the token with reference to the media style storage unit 256 (operation S820). Where a media style direction rule is to be applied to a token, camerawork for the current token is set based on the media style direction rule and at least one of the location information of the current characters and props, the camerawork history information (operation S825), and the set camerawork may be stored in the camerawork history managing unit 230 (operation S830).

Where a media style direction rule is not to be applied, it is determined whether a style direction rule is to be applied to the token with reference to the style rule storage unit 254 (operation S835). When there is a style direction rule, camerawork for the current token is set with reference to the style direction rule, and at least one of the location information of the current character and props, the camerawork history information (operation S840), and the set camerawork may be stored in the camerawork history managing unit 230 (operation S830).

Where a style direction rule is not to be applied, it is determined whether a general direction rule is to be applied to a token (operation S845). Where a general direction rule is to be applied, fragments are generated according to the general direction rule (operation S850). Some exemplary types of fragments are described above with reference to FIG. 5.

Where a general direction rule is not to be applied to the token, the process of the corresponding token is finished, the next token may be received, and the above procedures are repeatedly performed for each received token.

Figure 9:
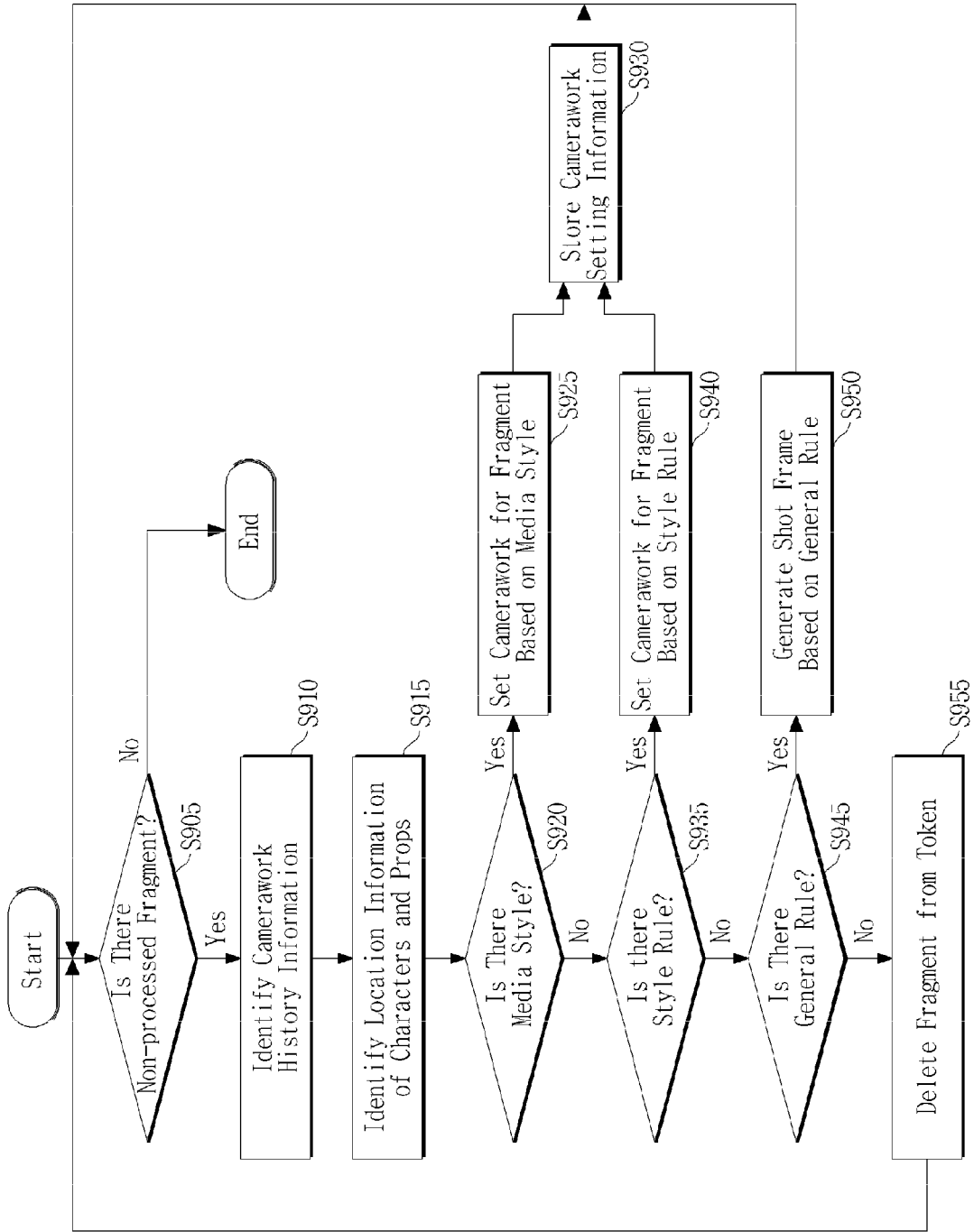
FIG. 9 is flowchart illustrating an exemplary method of processing fragments in a shot deciding unit shown in FIG. 2.

FIG. 9 illustrates an exemplary method of processing fragments in the shot deciding unit 246 as shown in FIG. 2.

It is determined whether camerawork for each fragment in a dialog has been determined (operation S905). Where the process determining camerawork for all fragments is complete, the procedure is finished.

Where fragments have not been processed, each fragment is sequentially processed one by one. First, the camerawork history information is identified, which is stored in the camerawork history managing unit 230 (operation S910). Pieces of location information of each character and prop are received from the location calculating unit 220 (operation S915).

It is determined whether a media style direction rule is to be applied to a fragment with reference to the media style storage unit 256 (operation S920). Where there is a media style direction rule to be applied to the fragment, camerawork for the current fragment is set with reference to the media style direction rule, and at last one of the location information of the current characters and props, the camerawork history information (operation S925), and the set camerawork may be stored in the camerawork history managing unit 230 (operation S930).

Where there is not a media style direction rule, it is determined whether a style direction rule is to be applied to the fragment with reference to the style rule storage unit 254 (operation S935). Where there is a style rule, camerawork for the current token is set based on the style direction rule, and at least one of the location information of the current character and props, the camerawork history information (operation S940), and the set camerawork may be stored in the camerawork history managing unit 230 (operation S930).

Where there is no style direction rule, it is determined whether a general direction rule is to be applied to the fragment (operation S945). Where there is a general direction rule, shot frames for each fragment are generated according to the general direction rule (operation S950). The shot frame is a part of a shot and may include all information related to the shot structure described above.

Where a general direction rule is not to be applied to the fragment, the corresponding fragment is deleted (operation S955) and the procedure is repeatedly performed for each following fragment.

Figure 10:
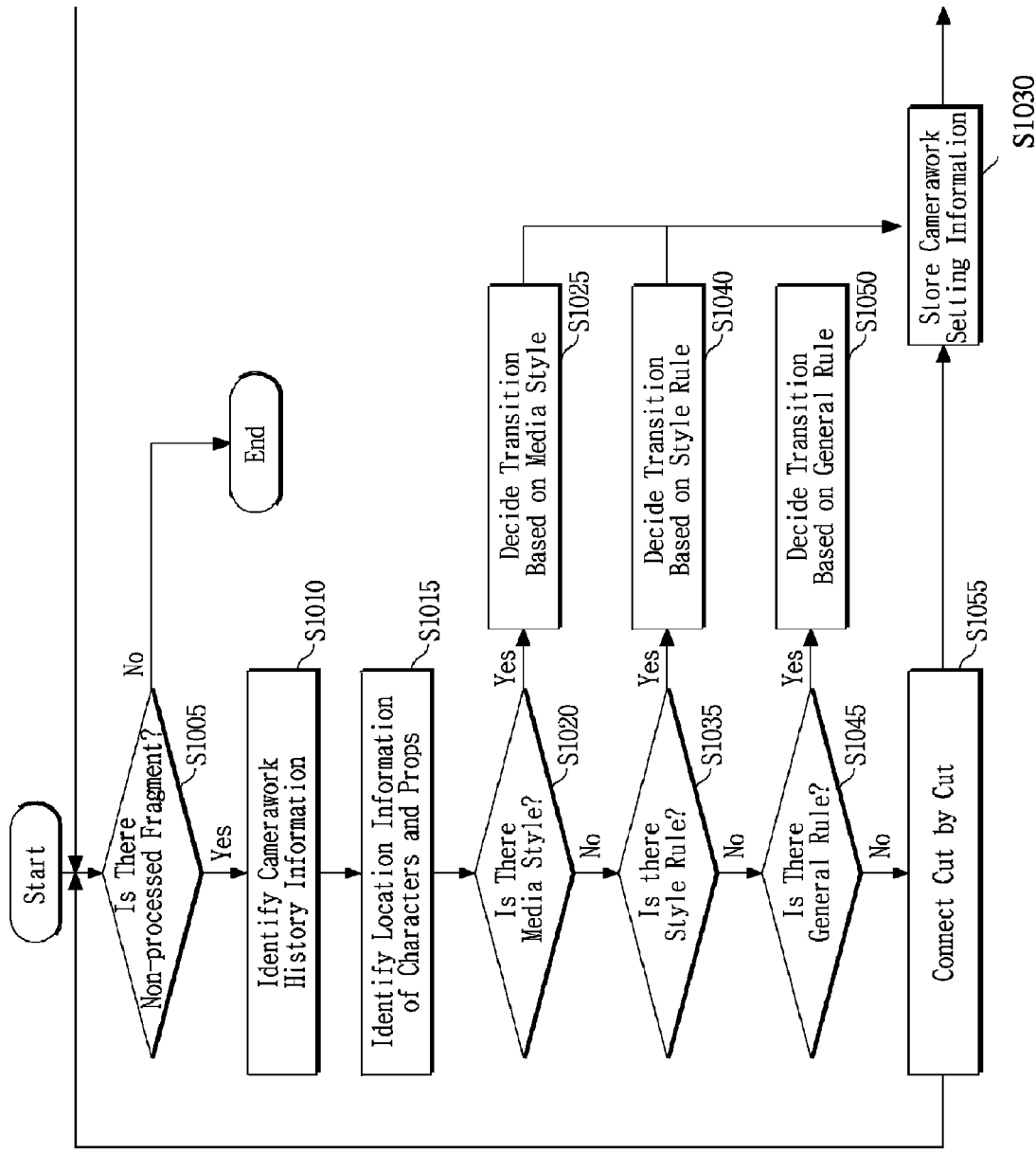
FIG. 10 is a flowchart illustrating an exemplary method of a transition deciding unit shown in FIG. 2.

FIG. 10 illustrates an exemplary processing method of the transition deciding unit 248 as shown in FIG. 2.

The transition deciding unit 248 searches for a direction rule to connect fragments and determines how to connect shots of respective fragments based on the direction rule (operation S1005). Where transitions have been determined for every frame of which corresponding shot frames have been determined the procedure is finished. Otherwise, all fragments of which the corresponding shot frames have not been determined are received sequentially.

The camerawork history information stored in the camerawork history managing unit 230 is identified (operation S1010). Then, pieces of the location information of each character and prop are received from the location calculating unit 220.

It is determined whether there is a media style direction rule to be applied to the fragment of which the shot frames have been determined, with reference to the media style storage unit 256 (operation S1020). Where a media style direction rule is to be applied to the fragment, transitions for the fragments are set based on the media style direction rule, and at least one of the location information of the current characters and props, the camerawork history information (operation S1025), and the set transitions may be stored in the camerawork history managing unit 230 (operation S1030).

Where there is no media style direction rule to be applied to the fragments, it is determined whether there is a style direction rule to be applied to the fragments, with reference to the style rule storage unit 254 (operation S1035).

Where a style direction rule is to be applied, the transitions for the fragments are set based on the style direction rule, and at least one of the location information of the current characters and props, the camerawork history information (operation S1040), and the set transitions may be stored in the camerawork history storage unit 230 (operation S1030).

Where there is no style direction rule, it is determined whether there is a general direction rule to be applied to the fragment of which the shot frames have been determined (operation S1045). Where there is a general direction rule, transitions for the fragments of which the shot frames have been determined are determined according to the general direction rule (operation S1050), and the determined transitions are stored in the camerawork history managing unit 230 (operation S1030).

Where there is not a general direction rule to be applied to the fragments of which the shot frames have been determined, the corresponding shot frames are connected by a cut (operation S1055), and this setting is stored in the camerawork history managing unit 230 (operation S1030).

Figure 11:
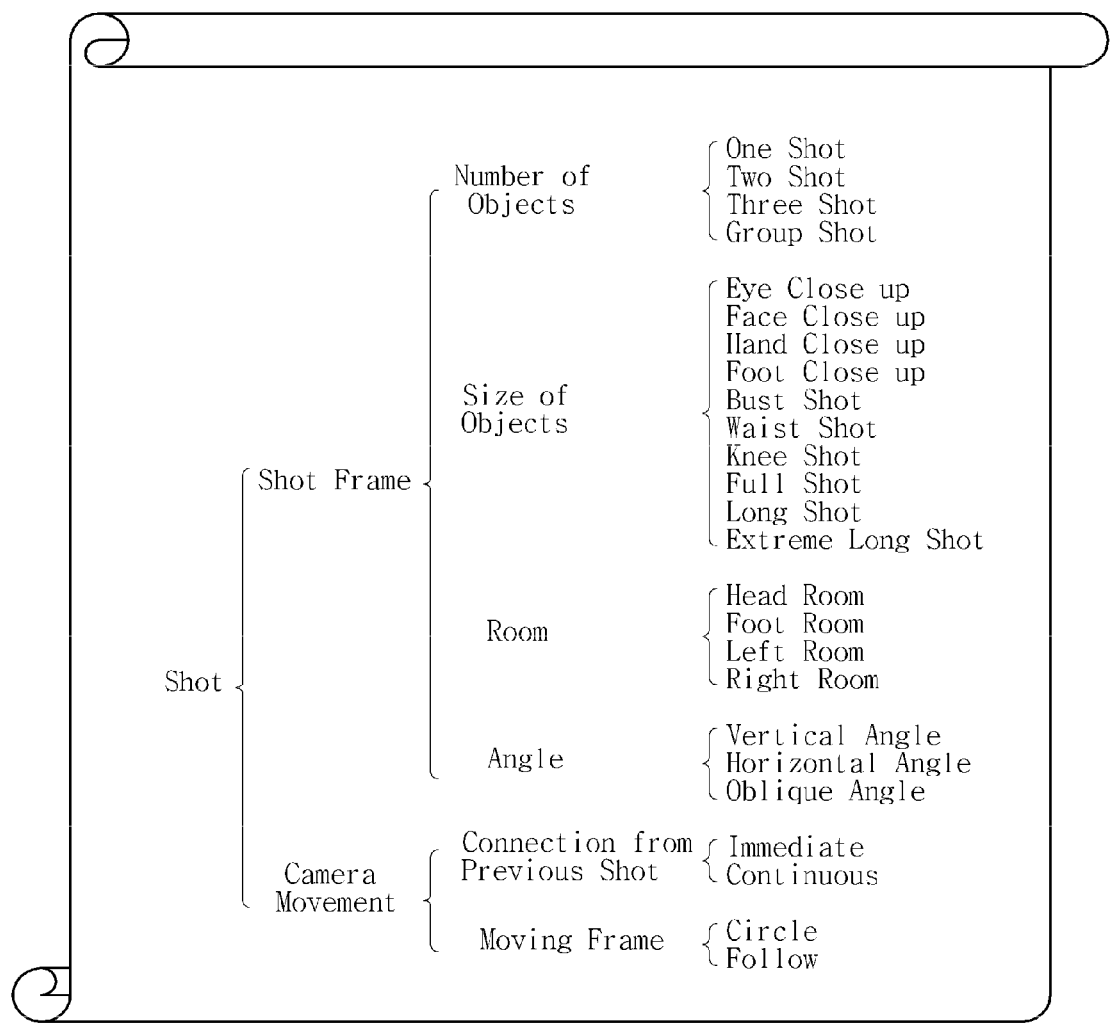
FIG. 11 is a diagram of a list of exemplary shots that may be used for camerawork.

FIG. 11 illustrates a list of exemplary types of shots that may be used for camerawork. Shots used for camerawork include shot frames and camera movements. Shot frames include the number of objects to be shot, a size of an object, a room, and an angle. The number of objects is the number of objects to appear on a screen, and for example, there may be a one-shot in which only one character is shown, a two-shot in which two characters are shown, a three-shot in which three characters are shown, and a group shot in which more than three characters are shown.

The size of an object refers to the size of an object shown in a screen, for example, there may be an eye close-up in which only eyes of a character are shown, a face close-up in which only a face is shown, a hand close-up in which only a hand or hands are shown, a foot close-up in which only a foot or feet are shown, a bust shot in which an upper body above the chest is shown, a waist shot in which an upper body above the waist, a knee shot in which a body above the knees is shown, a full shot in which the entire character is shown, a long shot in which the entire character and the background are shown fully, and an extreme long shot in which a character and background are taken from so much distance that the character is shown small and the background fills most of the screen.

The room refers to a space around an object on a screen, for example, there may be a head room in which there is shown a space above a character, a foot room in which there is shown a space below the legs of the character, a left room in which there is a space on the left of the character, and a right room in which there is a space on the right of the character.

The angle indicates where an object is seen from which angle on a screen, for example, there may be a vertical angle in which the object is seen vertically, a horizontal angle in which the object is seen horizontally, and an oblique angle in which the object is seen slantingly.

Examples of camera movement may be a connection from a previous shot and a moving frame. The connection from a previous shot indicates whether a previously set camerawork and the current camerawork may be connected cut by cut (immediate connection) or connected continuously by moving a camera. The moving frame defines how the camera moves from the current camerawork. For example, a camera may move circularly around a specific object, or follow a specific object.

Figure 12:
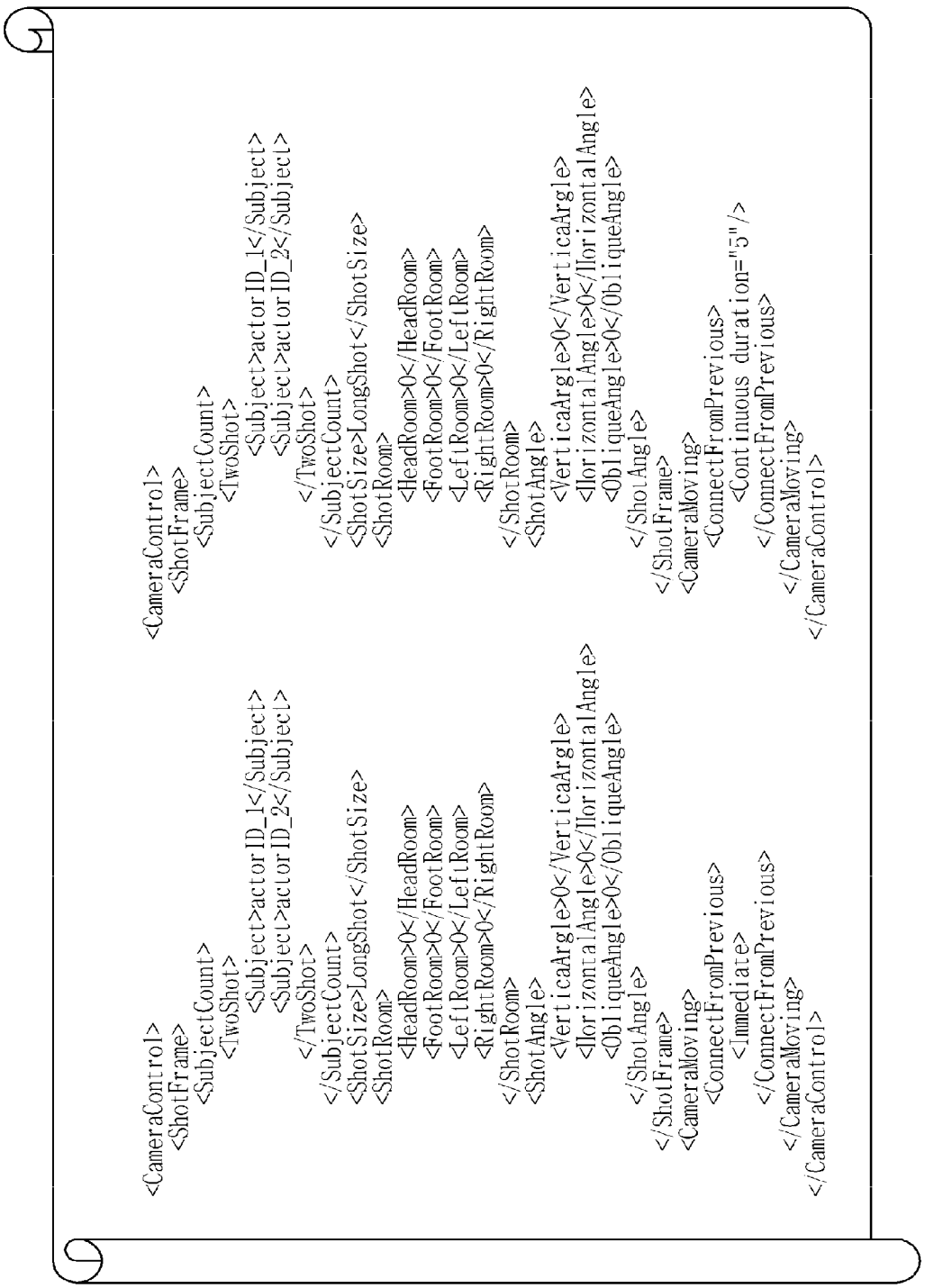
FIG. 12 is a diagram illustrating camerawork generated by an exemplary camerawork controlling apparatus.

FIG. 12 illustrates camerawork generated by an exemplary camerawork controlling apparatus. The result from the camerawork controlling apparatus as described above may be written in a markup language as shown in FIG. 12. By using such unified format, the written camerawork may be used in different application programs, and may be compatible with other apparatuses which can therefore use the camerawork.

A user may set a camerawork appropriate for a scene without setting the details of the camerawork or manually operating a camera, so that an ordinary user without the expertise may easily make a film or an animation.

Additionally, since information of various styles related to the camerawork is stored and a user may select one of the stored styles to use for the camerawork, the ordinary user may make comparatively natural images. Also, the user can easily change the settings such as the style and images with various effects may be obtained from the same scenario.

Moreover, the camerawork may be set to make the story of a scenario flow more naturally, thereby improving the focus of viewers on the story.

In addition, a variety of direction rules may be set and applied to different circumstances of the scenario, so that unique and high-quality images can be achieved.

Furthermore, united standard and format is used to represent a camerawork, the information related to the camerawork may be shared between different application apparatuses or programs.

The methods described above may be recorded, or fixed in one or more computer-readable media that includes program instructions to be implemented by a computer to cause a processor to execute or perform the program instructions. The media may also include, independent of or in combination with the program instructions, data files, data structures, and the like. Examples of computer-readable media may include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the methods and/or operations described above, or vice versa.

A number of exemplary embodiments have been described above. Nevertheless, it is understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A camerawork controlling apparatus comprising:
a direction deciding unit configured to receive dialogs extracted from a scenario, to divide at least one of the received dialogs into sub-elements according to a set of circumstances, and to determine a camerawork based on a direction rule to be applied to each sub-element and each of any remaining non-divided dialogs.

2. The camerawork controlling apparatus of claim 1, wherein the direction deciding unit determines the camerawork for each received dialog using at least one of location information of an object; history information of camerawork previously used; and a direction rule including at least one of a general direction rule, a style direction rule, and a media style direction rule.

3. The camerawork controlling apparatus of claim 1, wherein the direction deciding unit comprises:
a token processing unit to search for a direction rule to be applied to all received dialogs and to determine a camerawork corresponding to each received dialog to which the direction rule is to be applied and to divide any remaining received dialogs to which the direction rule is not to be applied into tokens;
a shot framer to search for direction rules corresponding to any respective divided tokens and to determine a camerawork for each corresponding token and to divide each non-corresponding token into fragments indicating positions where the camerawork starts;
a shot deciding unit to search for direction rules corresponding to any respective fragment and to determine a camerawork for each corresponding fragment and to determine shot frames for each non-corresponding fragments; and
a transition deciding unit to search for a direction rule to connect adjacent fragments and to determine a connection between shots in each fragment.

4. The camerawork controlling apparatus of claim 1, further comprising:
a data storage unit to store a direction rule to determine the camerawork.

5. The camerawork controlling apparatus of claim 4, wherein the data storage unit comprises:
a general rule storage unit to store general direction rules used to determine camerawork;
a style rule storage unit to store style direction rules used to determine camerawork using specific effects corresponding to particular situations; and
a media style storage unit to store media style direction rules used to determine camerawork to which pre-defined characteristics of individual users are reflected.

6. The camerawork controlling apparatus of claim 1, further comprising:
a location calculating unit to identify a location of an object including characters and props.

7. The camerawork controlling apparatus of claim 1, further comprising:
a camerawork history managing unit to store and analyze a history of previously used camerawork.

8. The camerawork controlling apparatus of claim 1, wherein the each dialog is divided into at least one of a speech token, an action token, and an emotion token and each of the at least one of the speech token, the action token, and the emotion token is further divided into fragments, wherein each fragment indicates a location where a camerawork starts.

9. A non-transitory computer readable medium comprising instructions, that when executed by a computer, cause the computer to have embodied thereon camerawork data representing a shot frame and camera movement information in the form of a markup language, wherein the shot frame and the camera movement information constitute a camerawork.

10. The non-transitory computer readable medium of claim 9, wherein the shot frame includes information of a number of objects in a shot, a size of each object, an empty space in a scene, and an angle at which the object is shot.

11. The non-transitory computer readable medium of claim 9, wherein the camera movement information includes information of connection from a previous shot and information of frame movement.

12. The non-transitory computer readable medium of claim 9, wherein the camerawork data is determined based on a direction rule, wherein dialogs are extracted from a scenario and received sequentially, at least one of the dialogs is divided into sub-elements according to circumstances, and the direction rule is applied to each divided sub-elements and each of any remaining non-divided dialogs.

13. A camerawork controlling method for use with a camera controlling apparatus, the method comprising:
- receiving in a direction deciding unit dialogs extracted from a scenario sequentially; and
- dividing at least one of the received dialogs into sub-elements according to circumstances and determining a camerawork based on a direction rule applied to each sub-element and each of any remaining non-divided dialogs by a token processing unit.

14. The camerawork controlling method of claim 13, wherein the determining of the camerawork determines the camerawork for the received dialog based on at least one of location information of an object; camerawork history information; and a direction rule including at least one of a general direction rule, a style direction rule, and a media style direction rule.

15. The camerawork controlling method of claim 13, wherein the determining of the camerawork comprises:
- determining a camerawork corresponding to the received dialogs by searching for a direction rule to be applied to the received dialogs and dividing any received dialog to which the direction rule is not to be applied into tokens by a token processing unit;
- determining camerawork for the tokens by searching for direction rules corresponding to the respective token and dividing any token not corresponding to the searched direction rules into fragments each of which indicates a location where a camerawork is inserted by a shot framer;
- determining camerawork for the fragments by searching for direction rules corresponding to respective fragments and determining shot frames for the respective fragments by a shot deciding unit; and
- determining connection between adjacent fragments by searching for a direction rule to connect the adjacent fragments by a transition deciding unit.

* * * * *